United States Patent [19] [11] 4,226,215
Kobayashi et al. [45] Oct. 7, 1980

[54] ELECTRONICALLY-CONTROLLED FUEL INJECTION SYSTEM FOR INTERNAL COMBUSTION ENGINE HAVING ODD NUMBERS OF CYLINDERS

[75] Inventors: Akio Kobayashi, Kariya; Kunio Endo, Anjo; Norio Omori, Kariya, all of Japan

[73] Assignee: Nippondenso Co., Ltd., Kariya, Japan

[21] Appl. No.: 927,818

[22] Filed: Jul. 25, 1978

[30] Foreign Application Priority Data

Jul. 28, 1977 [JP] Japan ................................. 52-91972

[51] Int. Cl.³ ............................................. F02B 3/00
[52] U.S. Cl. ................................................... 123/487
[58] Field of Search ........ 123/32 EA, 32 EB, 32 EC, 123/32 EF

[56] References Cited
U.S. PATENT DOCUMENTS 3,941,100  3/1976   Bensch et al. ............... 123/139 E X
3,991,727  11/1976  Kawai et al. .................... 123/32 EA
4,015,563  4/1977   Drews et al. ................... 123/32 EH
4,075,983  2/1978   Robinson ......................... 123/32 EA
4,133,323  1/1979   Adler ........................... 123/32 EA X Primary Examiner—Tony M. Argenbright
Attorney, Agent, or Firm—Cushman, Darby & Cushman

[57] ABSTRACT

An electronically-controlled fuel injection system for an internal combustion engine having odd numbers of cylinders, in which the quantity of fuel supplied to the engine cylinders is regulated by the duration of pulses of a fuel injection pulse signal applied to solenoid-operated fuel injection valves, and two fuel injection pulses are generated in each operating cycle of the engine in synchronism with the revolution of the engine. In the system, the frequency of an ignition signal generated by an ignition unit in the engine is doubled to provide an output pulse signal, and the frequency of such an output pulse signal is then divided by the number of engine cylinders so as to generate the fuel injection pulse signal in synchronism with this frequency-divided output pulse signal.

10 Claims, 3 Drawing Figures

ELECTRONICALLY-CONTROLLED FUEL INJECTION SYSTEM FOR INTERNAL COMBUSTION ENGINE HAVING ODD NUMBERS OF CYLINDERS

BACKGROUND OF THE INVENTION

This invention relates to an electronically-controlled fuel injection system for an internal combustion engine, and more particularly to a system of the kind above described which is applied to an internal combustion engine having odd numbers of cylinders so as to initiate injection of fuel at intervals of a predetermined crank angle in synchronism with the revolution of the engine.

An electronically-controlled fuel injection system for an internal combustion engine is disclosed in, for example, Japanese Patent Application Kokai No. 9757/72 laid open May 18, 1972. According to the disclosure of this application, the quantity of fuel to be supplied to the engine to meet the operating requirement of the engine is regulated by the duration of pulses of a fuel injection pulse signal applied to solenoid-operated fuel injection valves, and the fuel injection timing is selected to be synchronous with an ignition signal gathered by an ignition unit in the engine so as to effect two fuel injections in each operating cycle (two revolutions) of the engine.

However, this known system is only applicable to an internal combustion engine having even number of cylinders such as four, six or eight cylinders and is not directly applicable to an internal combustion engine having odd numbers of cylinders such as three, five or seven cylinders. This is because, in the case of the latter engine, it is impossible to control the fuel injection timing on the basis of the ignition signal in such a manner that two fuel injections occur at equal angular intervals in each operating cycle of the engine. That is, it occurs that a fuel injection timing exists between one ignition timing and the next, and it is unable to utilize the ignition signal in that form for the determination of the fuel injection timing. Thus, a revolution sensor for sensing the angular position of revolution of the engine at angular intervals of 180° is essentially required. However, additional mounting of such a revolution sensor on the engine is encountered with various practical problems including the problem of finding a suitable mounting space available in the narrow engine room of the vehicle, the problem of manufacturing and maintenance complexities due to the increase in the number of connection wires in the engine room, and the problem of increased costs due to the work required for mounting the sensor on the engine.

SUMMARY OF THE INVENTION

With a view to obviate the prior art problems above described, it is a primary object of the present invention to provide a novel and improved electronically-controlled fuel injection system for an internal combustion engine which comprises a waveform reshaping circuit for reshaping the waveform of an ignition signal, a frequency doubler circuit for doubling the frequency of the output pulse signal of the waveform reshaping circuit thereby providing an output pulse signal having a frequency double the frequency of the ignition signal, and a frequency divider circuit for dividing the frequency of the output pulse signal of the frequency doubler circuit by the number of cylinders of the engine. The electronically-controlled fuel injection system according to the present invention is therefore advantageous in that it does not require a special revolution sensor for effecting two fuel injections in each operating cycle of the engine in synchronism with the ignition signal even when the engine has odd numbers of cylinders, and the fuel injection can be carried out or started at equal angular intervals or at intervals of 360° in crank angle.

DESCRIPTION OF THE PREFERRED EMBODIMENT

A preferred embodiment of the electronically-controlled fuel injection system according to the present invention as applied to a four-cycle internal combustion engine having five cylinders will be described in detail with reference to the drawings.

Figure 1:
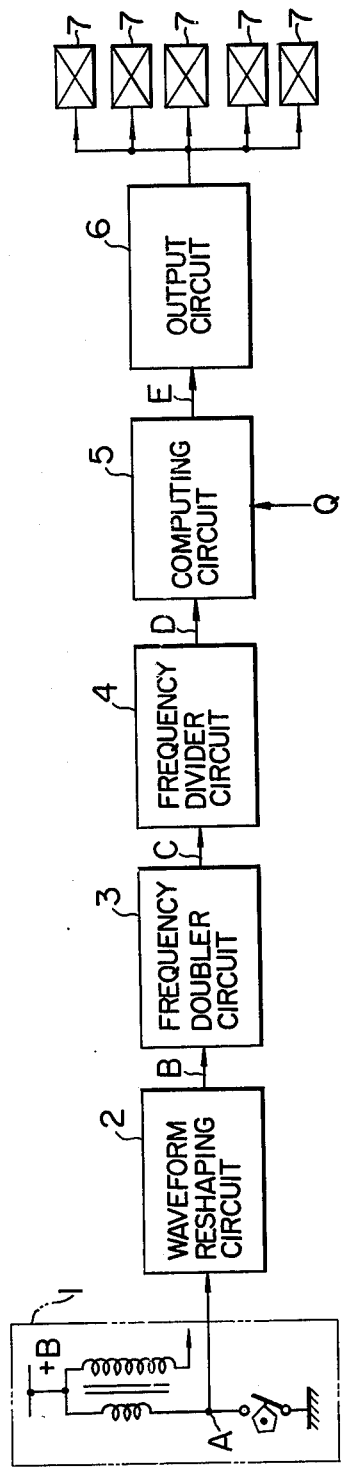
FIG. 1 is a block diagram of a preferred embodiment of the electronically-controlled fuel injection system according to the present invention.
Figure 2:
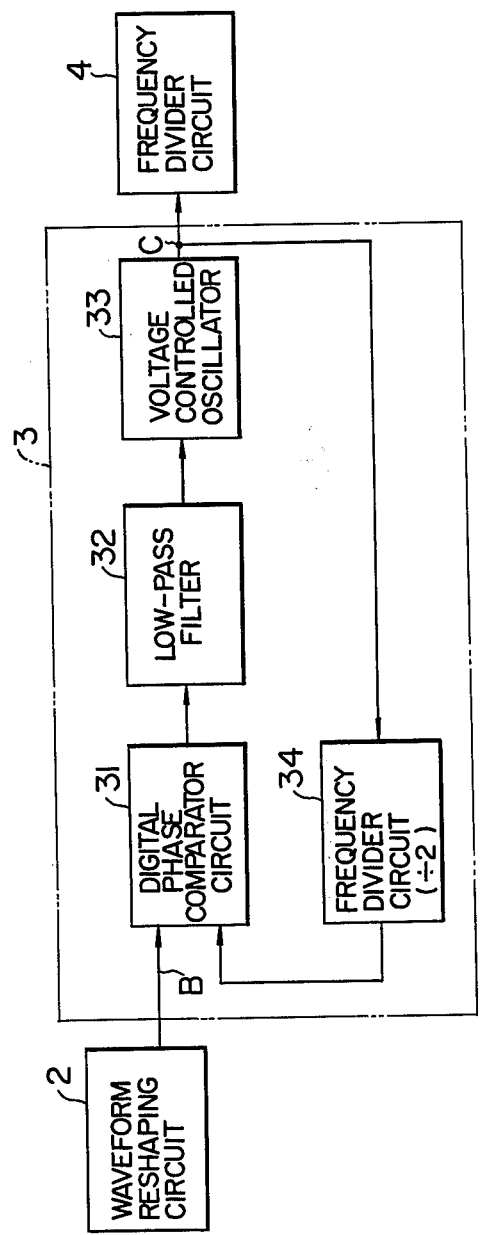
FIG. 2 is a block diagram showing the detailed structure of the frequency doubler circuit shown in FIG. 1.

Referring to FIG. 1, the reference numeral 1 designates an ignition unit of the engine. A waveform reshaping circuit 2 is connected to the ignition unit 1 to receive an interrupted ignition signal A having a waveform as shown in FIG. 3A from the primary winding of the ignition unit 1 for reshaping the waveform of the ignition signal A, thereby providing an output pulse signal B having a waveform as shown in FIG. 3B. A frequency doubler circuit 3 is connected to the waveform reshaping circuit 2 to double the frequency of the output pulse signal B of the circuit 2 thereby providing an output signal C having a waveform as shown in FIG. 3C. As shown in FIG. 2, this frequency doubler circuit 3 is in the form of a conventional phase locked loop (PLL) composed of a voltage controlled oscillator 33 generating an oscillation frequency varying in response to an input voltage (which oscillator may be in the form of an integrated circuit MC4324 manufactured by the Motorola Inc.), a frequency divider circuit 34 dividing the frequency of the output pulse signal of the oscillator 33 by the factor of two, a digital phase comparing circuit 31 comparing the phase of the output pulse signal of the frequency divider circuit 34 with the phase of the output pulse signal B of the waveform reshaping circuit 2 thereby providing an output pulse signal having a pulse width corresponding to the phase difference (which comparing circuit may be in the form of an integrated circuit MC4044 manufactured by the Motorola Inc.), and a low-pass filter 32 including a resistor and a capacitor for smoothing the output pulse signal of the digital phase comparing circuit 31. The voltage controlled oscillator 33 is controlled so that the half of its oscillation frequency is equal to the frequency of the output pulse signal B of the waveform reshaping circuit 2. Therefore, the oscillation frequency of this oscillator 33 is double the frequency of the output pulse signal B of the waveform reshaping circuit 2, hence, that of the ignition signal, as shown in FIG. 3C.

Figure 3:
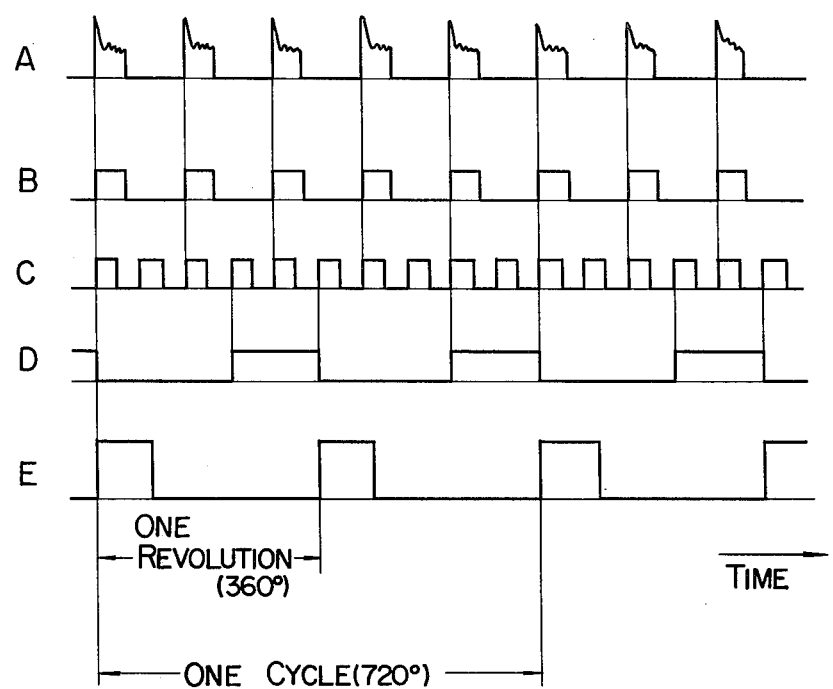
FIG. 3 is a waveform diagram showing the signal waveforms appearing at various parts of FIGS. 1 and 2.

A frequency divider circuit 4 is connected to the frequency doubler circuit 3 to divide the frequency of the output pulse signal C of the circuit 3 by the number of engine cylinders which is five in this case, thereby providing an output pulse signal D having a waveform as shown in FIG. 3D. A computing circuit 5 of known structure is connected to the frequency divider circuit 4 and may include switching means such as that disclosed in Japanese Patent Application Kokai (Laid-Open) No. 9757/72 cited hereinbefore. The output pulse signal D of the frequency divider circuit 4 is applied to the computing circuit 5 to charge a capacitor with a constant current during the period of time of each pulse in the output pulse signal D of the frequency divider circuit 4. At the end of each pulse in the output pulse signal D of the frequency divider circuit 4, the capacitor discharges a current value corresponding to the quantity Q of intake air supplied to the engine. As a result, a fuel injection pulse signal E having a waveform as shown in FIG. 3E appears from the computing circuit 5, and each pulse in this signal E starts to rise upon initiation of the capacitor discharge and falls upon termination of the capacitor discharge. The pulse width of this fuel injection pulse signal E is inversely proportional to the engine speed and directly proportional to the quantity Q of intake air and has thus a value corresponding to the operating requirement of the engine. It will be seen from FIG. 3 that the pulses of the fuel injection pulse signal E appear at intervals of 360° in crank angle, that is, the fuel injection is started at such intervals. An output circuit 6 is connected to the computing circuit 5 to amplify the fuel injection pulse signal E applied from the circuit 5 thereby sequentially energizing solenoid-operated fuel injection valves 7 associated with the individual cylinders in a predetermined sequential order.

In operation, the ignition signal A applied from the ignition unit 1 is subjected to waveform reshaping in the waveform reshaping circuit 2 and is then applied to the frequency doubler circuit 3 to be doubled in its frequency, so that an output pulse signal C having a period which is one-half the ignition period appears from the circuit 3. The frequency of this output pulse signal C is then divided by the factor of five in the frequency divider circuit 4 as shown in FIG. 3D, and such a frequency-divided output pulse signal D appears from the frequency divider circuit 4. The capacitor in the computing circuit 5 is charged with a constant current during the period of time of each pulse in this output pulse signal D, and discharges a current value corresponding to the quantity Q of intake air upon disappearance of each pulse. Thus, a fuel injection pulse signal E as shown in FIG. 3E appears from the computing circuit 5, and each pulse in this signal E lasts between the initiation timing and the termination timing of the capacitor discharge. This pulse signal E is applied, after being amplified by the output circuit 6, to the solenoid-operated fuel injection valves 7 which inject fuel into the individual cylinders of the engine. Since the frequency of the ignition signal A is doubled by the frequency doubler circuit 3 to obtain the fuel injection pulse signal E having the waveform shown in FIG. 3E, two fuel injections occur in each operating cycle (two revolutions) of the engine at equal angular intervals.

We claim:

1. An electronically-controlled fuel injection system for an internal combustion engine having an odd number of cylinders, in which the quantity of fuel supplied to the engine cylinders is regulated by the duration of pulses of a fuel injection pulse signal applied to solenoid-operated fuel injection valves, and two fuel injection pulses are generated in each operating cycle of the engine in synchronism with the revolution of the engine, said system comprising:

a waveform reshaping circuit adapted to be connected to an ignition unit of the engine for reshaping the waveform of an ignition signal upon receipt from said ignition unit thereby providing an output pulse signal subjected to the waveform reshaping;

a frequency doubler circuit connected to said waveform reshaping circuit for doubling the frequency of the output pulse signal of said waveform reshaping circuit thereby generating a frequency-doubled output pulse signal;

a frequency divider circuit connected to said frequency doubler circuit for dividing the frequency of the output pulse signal of said frequency doubler circuit by the number of engine cylinders thereby providing a frequency-divided output pulse signal; and computing means connected to said frequency divider circuit for generating said two fuel injection pulses in synchronism with the output pulse signal of said frequency divider circuit.

2. An electronically-controlled fuel injection system as claimed in claim 1, wherein said frequency. doubler circuit comprises:

a voltage controlled oscillator connected at its output terminal to said frequency divider circuit for generating said output pulse signal of said frequency doubler circuit;

a frequency divider circuit connected to said voltage controlled oscillator for dividing the frequency of the output pulse signal of said oscillator by the factor of two;

a phase comparing circuit connected to said frequency divider circuit and said waveform reshaping circuit for comparing the phase of the output pulse signal of said frequency divider circuit with the phase of the output pulse signal of said waveform reshaping circuit thereby providing an output pulse signal having a pulse width corresponding to the phase difference; and a low-pass filter connected between said phase comparing circuit and said voltage controlled oscillator for smoothing the output pulse signal of said phase comparing circuit.

3. An electronically controlled fuel injection system for developing a plural number N of fuel injection control pulses per operating cycle of a given type of internal combustion engine having an odd number M of cylinders and a given type of ignition unit capable of providing M ignition pulses per said cycle which comprises plural revolutions of said engine, said system comprising:

means operative on said ignition pulses by a ratio N/M for generating output pulses having a recurrence rate of N pulses for every Mth ignition pulse, and means operative on said output pulses for developing N fuel injection control pulses respectively at equal angular intervals in each cycle of M ignition pulses.

4. A system as in claim 3 wherein N is an even number.

5. A system as in claim 3 in combination with said internal combustion engine having air intake means and an odd number M of cylinders requiring an even number of fuel injections per said operating cycle, and with said ignition unit connected to said engine for providing said M ignition pulses per said operating cycle to said output pulse generating means, said means for developing said injection control pulses being operative to cause the pulse width of said fuel injection control pulses to have a pulse width inversely proportional to the speed of said engine and directly proportional to a quantity of air taken in by said air intake means, and means responsive to said fuel injection control pulses for injecting fuel into said cylinders said even number of times per engine operating cycle.

6. A system as in claim 3 or 5 wherein said output pulse generating means includes means for dividing by M and means for multiplying by N.

7. A system as in claim 3 or 5 wherein N is two.

8. A system as in claim 3 or 5 wherein M is five.

9. A system as in claim 5 wherein said engine operating cycle is two engine revolutions.

10. A system as in claim 5 wherein said developing means comprises a capacitor which is charged with a constant current during the existence of each of said output pulses from said generating means and which discharges a current value corresponding to a quantity of air supplied to said engine by said air intake means upon termination of each said output pulse to cause each said fuel injection control pulse to exist between initiation and termination of the discharge of said capacitor.

* * * * *